United States Patent
Chen

(10) Patent No.: US 9,533,727 B2
(45) Date of Patent: Jan. 3, 2017

(54) UNICYCLE WITH INNER LEG SUPPORTS

(71) Applicant: Shane Chen, Camas, WA (US)

(72) Inventor: Shane Chen, Camas, WA (US)

(*) Notice: Subject to any disclaimer, the term of this patent is extended or adjusted under 35 U.S.C. 154(b) by 0 days.

(21) Appl. No.: 13/875,709

(22) Filed: May 2, 2013

(65) Prior Publication Data

US 2014/0327224 A1 Nov. 6, 2014

(51) Int. Cl.
*B62K 1/00* (2006.01)

(52) U.S. Cl.
CPC ........................ *B62K 1/00* (2013.01)

(58) Field of Classification Search
CPC .......................................... B62K 1/00
USPC ............................ 280/205; 180/21
See application file for complete search history.

(56) References Cited

U.S. PATENT DOCUMENTS

| | | | | |
|---|---|---|---|---|
| 228,908 A * | 6/1880 | Langmaak et al. | ...... | B62K 1/00 280/207 |
| 524,019 A * | 8/1894 | Desmond | ................ | B62K 1/00 280/205 |
| 572,941 A * | 12/1896 | Munro | ..................... | B62K 1/00 280/205 |
| 660,835 A * | 10/1900 | Boes | ........................ | B62K 1/00 280/205 |
| 2,971,773 A * | 2/1961 | McKissick | ............... | B62K 1/00 188/5 |
| 3,152,813 A * | 10/1964 | Brown | .................. | A63G 13/02 280/11.19 |
| 4,062,558 A * | 12/1977 | Wasserman | .............. | B62K 1/00 280/200 |
| 4,162,084 A * | 7/1979 | Mikina | ..................... | B62L 1/10 188/24.22 |
| 4,194,751 A * | 3/1980 | Shinmura | ............... | A63B 25/04 280/11.201 |
| 5,002,295 A * | 3/1991 | Lin | ......................... | B60B 1/003 280/205 |
| 5,326,118 A * | 7/1994 | DeRosa | .................... | B62K 1/00 280/205 |
| 5,333,930 A * | 8/1994 | Glenn | ........................ | B62J 1/18 297/195.1 |
| 5,509,831 A * | 4/1996 | Gelbart | .................. | B63H 16/12 440/27 |
| 5,868,413 A * | 2/1999 | Cabrera | ................... | B62K 1/00 280/205 |
| 6,640,662 B1 * | 11/2003 | Baxter | ..................... | B62M 3/04 280/259 |
| D505,363 S * | 5/2005 | Aube | .......................... | D12/107 |
| 6,895,834 B1 * | 5/2005 | Baatz | ...................... | B62M 3/02 280/259 |
| D560,560 S * | 1/2008 | Dacsev | ........................ | D12/107 |

(Continued)

OTHER PUBLICATIONS

Web page, Nimbus 20", 24" and 28" Ultimate Wheel products, www.unicycle.com, Nimbus.

*Primary Examiner* — Joseph Rocca
*Assistant Examiner* — Gabriela C Craciun
(74) *Attorney, Agent, or Firm* — Steven J. Sullivan

(57) ABSTRACT

A pedal-powered one-wheeled vehicle with apparatus coupled to the pedals for laterally stabilizing a user's legs. The user can apply inward pressure to the leg stabilizing apparatuses to achieve greater lateral stability and more precise control of the vehicle. Means may be provided for keeping the leg stabilizing apparatuses from moving too far apart, and for varying the distance between the pedals. Some embodiments may have an elliptical wheel.

20 Claims, 3 Drawing Sheets

(56) References Cited

U.S. PATENT DOCUMENTS

| | | | |
|---|---|---|---|
| 7,350,796 B2* | 4/2008 | Misevski | B62M 1/36 280/259 |
| 7,537,229 B1* | 5/2009 | Wu | B62H 1/12 280/205 |
| 2008/0143073 A1* | 6/2008 | Ungar | B62K 1/00 280/205 |
| 2011/0056757 A1* | 3/2011 | Polutnik | B62K 1/00 180/65.51 |
| 2011/0220427 A1* | 9/2011 | Chen | B62K 1/00 180/21 |

* cited by examiner

UNICYCLE WITH INNER LEG SUPPORTS

FIELD OF THE INVENTION

The present invention relates to pedal-powered single-wheeled vehicles, particularly those without seats.

BACKGROUND OF THE INVENTION

Unicycles, most commonly pedal-powered and equipped with seats, are widely used for recreation as well as for acrobatic performance. As a recreation and exercise device, unicycles are difficult to learn to use. The difficulty provides an entertaining challenge but at the same time deters some people who otherwise would be interested in learning.

There also exist seatless unicycles, popularly known as "Ultimate Wheel" or sometimes "Impossible Wheel" (although the latter may also refer to a seatless unicycle with unmoving foot supports). These require even more skill than seated unicycles because the user's feet on the pedals are the only points of contact between the user and vehicle. Without a seat it is extremely difficult to prevent the wheel from tipping sideways to an undesired degree during the pedaling motion. Unwanted sideways tilting of the vehicle can cause loss of side-to-side balance, or can hinder propulsion by causing an uncovered wheel to rub against the user's legs.

A standing pedal-powered unicycle with means for greater lateral stability would therefore be useful as a more accessible alternative to the prior art, as a training device to prepare for more difficult types of unicycles, or simply to provide additional variety in the field.

SUMMARY OF THE INVENTION

The present invention is a single-wheeled vehicle having greater lateral stability and precision of control than the prior art. The unicycle of the present invention has leg stabilizing apparatuses attached to the pedals and extending upward to come into contact with the user's legs when the user's feet are in place upon the pedals. The user can apply inward pressure to the leg stabilizing apparatuses to reduce unwanted side-to-side leaning during the pedaling motion, and to increase precision of control of the vehicle during turns, on slopes, and on rough surfaces.

Some embodiments of the present invention may have an elliptical wheel. This overcomes the inherent difficulty of applying torque to the wheel at the points in the pedaling cycle when the two pedals are vertically aligned.

The attainment of the foregoing and related advantages and features of the invention should be more readily apparent to those skilled in the art, after review of the following more detailed description of the invention taken together with the drawings.

DETAILED DESCRIPTION

Figure 1:
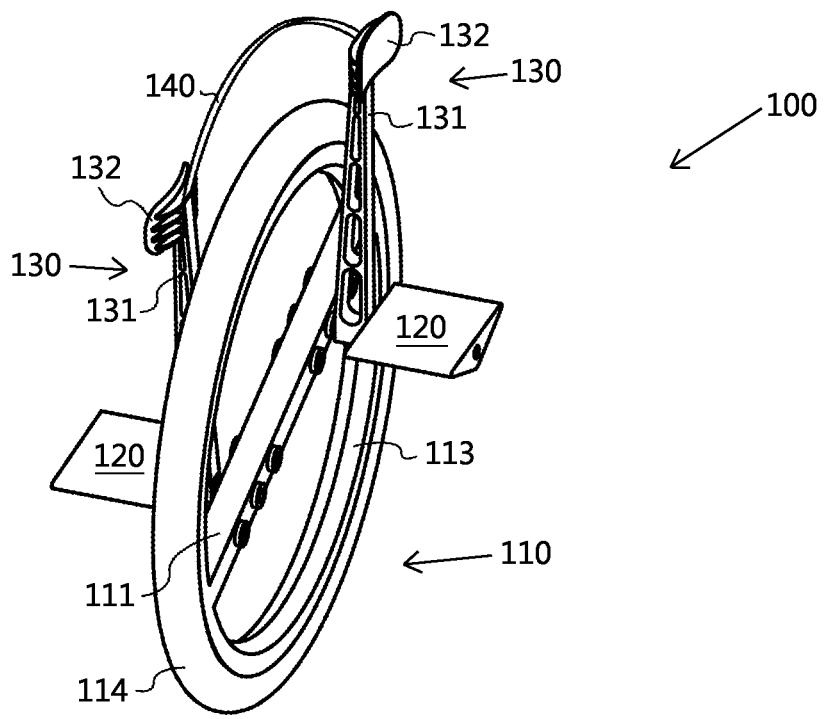
FIG. 1 is a perspective view of an embodiment of a vehicle in accordance with the present invention.
Figure 2:
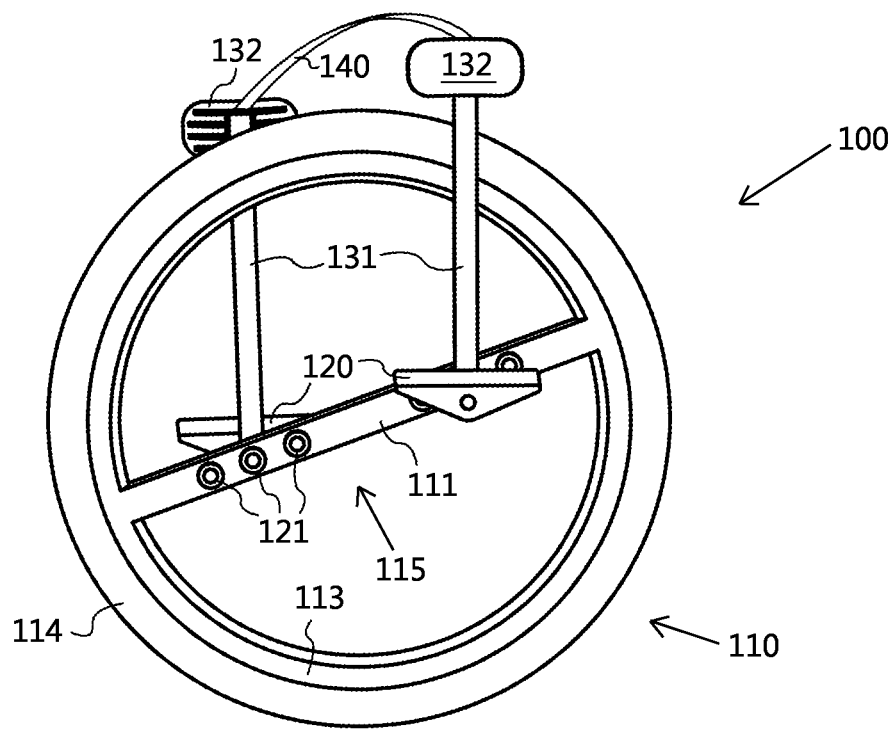
FIG. 2 is a side view of the vehicle of FIG. 1.

FIGS. 1 and 2 show an embodiment of a vehicle 100 in accordance with the present invention. Vehicle 100 comprises a single wheel 110, two pedals 120 coupled to wheel 110 for propelling the vehicle, and leg stabilizing apparatuses 130 coupled to pedals 120. As shown in FIGS. 1 and 2, wheel 110 may have a rim 113, a first tire 114 and a frame 115 to which the pedals are coupled. In the embodiments of FIGS. 1 and 2, frame 115 has a single structural bar 111 spanning the diameter of the wheel, although in other embodiments the wheel and frame can be constructed in a variety of different ways without departing from the present invention. As shown, pedals 120 are coupled to the frame 115, thus on the sides of wheel 110, such that they can support a user who uses pedals 120 to drive wheel 110. A leg stabilizing apparatus 130 is preferably coupled to the inward sides of each of pedals 120. Each leg stabilizing apparatus 130 comprises a vertical member 131 which extends generally upward from pedal 120. (The directions "upward" and "vertical" apply to the position of leg stabilizing apparatus 130 when vehicle 100 is in use. These directions are "general" because leg stabilizing apparatus 130 pivots along with pedal 120 as the user's legs undergo small changes in angle during the pedaling motion.) A leg contact surface 132 is preferably attached to each vertical member 131 at a height that allows it to contact the user's leg. As shown, in FIGS. 1-5, the height of the leg contact surfaces is preferably that they contact a user's legs near or below the knees.

In vehicle 100 of FIGS. 1-2, vertical member 131 is a single strut coupled to pedal 120 and to leg contact surface 132; in other embodiments, however, leg stabilizing apparatuses 130 may be constructed differently. For instance, vertical member 131 may be hinged such that it can fold downward toward pedal 120 (but is not foldable in the direction of the wheel, remaining rigid against inward force from the user's legs). Also, in other embodiments vertical member 131 and pedal 120 may be formed from the same piece of material. Likewise, vertical member 131 and leg contact surface 132 may be formed from the same piece of material.

When the user is standing with his feet on pedals 120 and leg contact surfaces 132 is placed against his legs, the user can apply inward pressure to leg contact surfaces 132. This laterally stabilizes the vehicle and supports the user's legs, thereby enabling the user to control the vehicle much more easily than if the only points of contact between user and vehicle were the user's feet on the pedals. Using leg stabilizing apparatuses 130, the user can more easily steer the vehicle, stay firmly connected to the vehicle on slopes and on rough terrain, and prevent the vehicle from unintentionally tipping sideways during riding as well as during mounting and dismounting. Leg contact surfaces 132 may be made of a yielding, slightly soft material, such as rubber. Leg contact surfaces 132 may also both have a concave curvature approximately conforming to the curvature of the medial surfaces of the user's legs. These features better enables leg contact surfaces 132 to be held against the user's legs through friction. Leg stabilizing apparatuses may be mounted with a slight outward slant in order to ensure that the user can easily apply pressure to leg contact surfaces 132.

Means may be provided for keeping leg stabilizing apparatuses 130 within a certain distance of each other, since their center of gravity relative to the pivot point of pedals 120 will otherwise cause them to freely fall forward or backward when they are not both held in place by the user. This may be achieved by a connecting element 140 coupled to both of leg stabilizing apparatuses 130, preventing leg stabilizing apparatuses 130 from moving beyond a certain distance apart. Therefore when one of the leg stabilizing apparatuses is held in a generally vertical position by one of the user's legs, the other will remain in a similar position as well. Connecting element 140 may take various forms, such as an elastic band or a flexible strip of plastic (as shown in FIGS. 1-2) coupled to the upper portions of both of vertical members 131.

An alternative means of keeping leg stabilizing apparatuses 130 within a certain distance of each other is by attaching a weight beneath each of pedals 120, in order to bring the combined center of gravity of leg stabilizing apparatus 130 and pedal 120 to a point closer to the ground than the pivot point of pedal 120. Leg stabilizing apparatuses 130 will therefore tend to stand generally vertical above pedals 120 even when not held in place by the user.

Means may be provided for selectively coupling pedals 120 to wheel 110 at different distances from the center of wheel 110, according to the user's preference. As shown in FIGS. 1-2, the wheel may have a plurality of pedal attachment points 121, allowing the user to choose how far from the center of wheel 110 to attach pedals 120.

Figure 3:
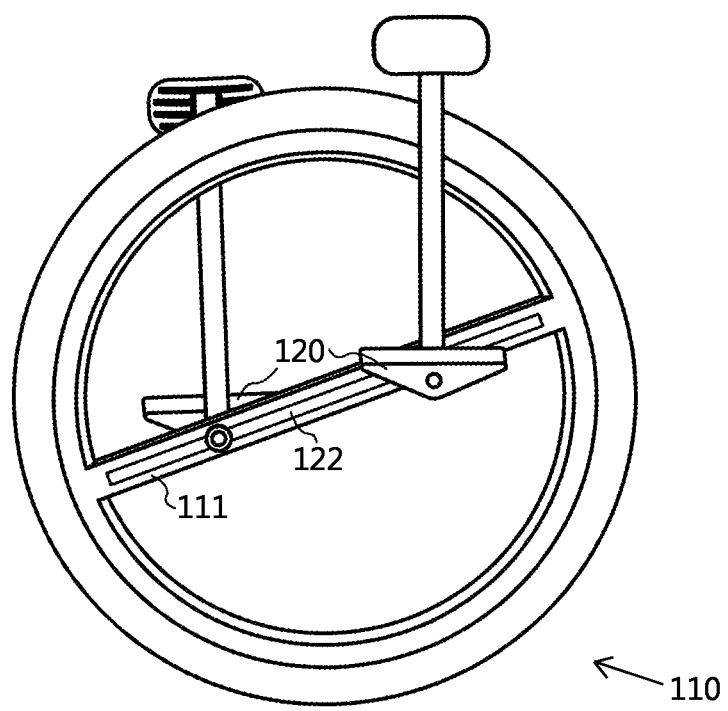
FIG. 3 is a side view of another embodiment of a vehicle in accordance with the present invention, having a sliding track for the pedals.

FIG. 3 shows an alternative to the plurality of pedal attachments points described above. In this embodiment structural bar 111 may have a track 122 along which pedals 120 can slide. Not only can sliding track 122 be used for fine control of the position at which pedals 120 are attached, it can also be configured to allow the distance between pedals 120 to be variable while they are being used to propel the vehicle. In the latter case, pedals 120 are biased (by springs or other means) so that they tend to keep a certain distance from the center of wheel 110, but can move farther apart or closer together depending on the amount of force being applied by the user. The sliding track 122 can therefore be configured to automatically adjust the distance of the pedals 120 from the center of wheel 110 in order to facilitate propulsion during points in the pedaling cycle at which it is normally difficult apply torque.

Figure 4:
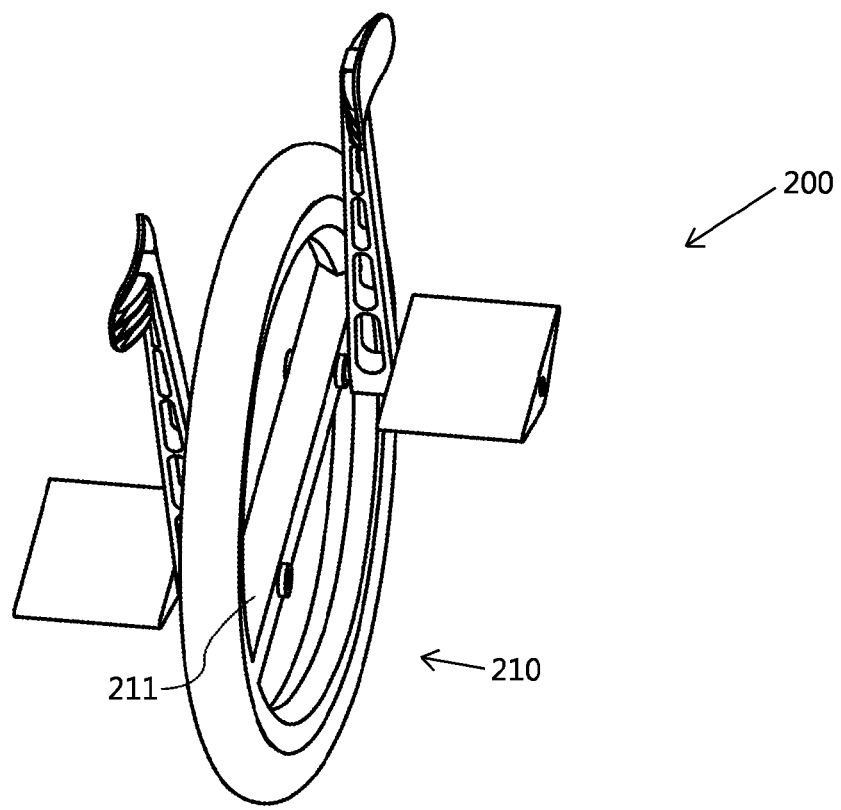
FIG. 4 is a perspective view of another embodiment of a vehicle in accordance with the present invention, having an elliptical wheel.
Figure 5:
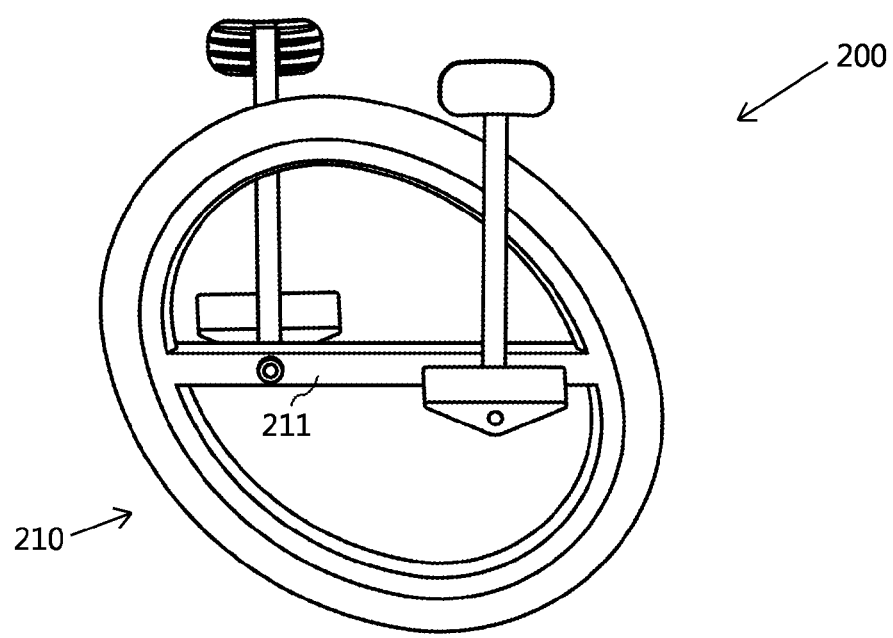
FIG. 5 is a side view of the vehicle of FIG. 4.

FIGS. 4-5 show another embodiment of a vehicle 200 in accordance with the present invention. Vehicle 200 differs from vehicle 100 of FIGS. 1-2 in that the shape of the wheel is elliptical instead of circular. The elliptical wheel compensates for the difficulty of applying torque to the wheel during points in the pedaling cycle when the pedals are vertically aligned, thus fulfilling a similar function to the biased sliding track described above.

FIGS. 1-3 illustrate that vehicle 100 may have a single shaft 11 and pedals 120 coupled to that shaft. FIGS. 4-5 illustrate that vehicle 200 may have a single wheel shaft 211.

The invention claimed is:

1. A pedal-powered vehicle, comprising:
a single wheel structure having an axis of rotation, a wheel rim and a first tire coupled on the rim;
a first pedal and a second pedal each pivotally coupled about a pivot axis to the wheel structure and spaced from the axis of rotation to permit a user to propel the wheel structure, the pedals and wheel structure being configured such that the pedals complete a 360 degree rotation about the axis of rotation of the wheel structure as a user pedals the vehicle; and
a first leg stabilizing contact member disposed interiorly of and adjacent to the first pedal and which, during use, ascends above the first pedal in such a position as to contact the leg of a user standing on the first pedal throughout an entire 360 rotation of the pedal around the axis of rotation, the first leg stabilizing contact member rotating about the axis of rotation along with the first pedal; and
a second leg stabilizing contact member disposed interiorly of and adjacent to the second pedal and which, during use, ascends above the second pedal in such a position as to contact the leg of a user standing on the second pedal throughout an entire 360 rotation of the pedal around the axis of rotation, the second leg stabilizing contact member rotating about the axis of rotation along with the second pedal.

2. The vehicle of claim 1, wherein each leg stabilizing contact member includes an ascending shaft that, in use, is coupled at one end proximate its respective pedal and has a leg contact surface coupled proximate the other end.

3. The vehicle of claim 2, wherein the leg contact surface extends substantially perpendicular to a primary axis of the ascending shaft.

4. The vehicle of claim 3, wherein the leg contact surface has at least one of:
a curved shape so as to center on a user's leg; and
a compressible material disposed towards a user's leg.

5. The vehicle of claim 1, wherein each contact member is configured to absorb interiorly directed force from a user's legs to increase precision of control during use.

6. The vehicle of claim 1, further comprising a frame disposed within the rim and wherein the first and second pedals are coupled directly to the frame.

7. The vehicle of claim 1, wherein the contact members are biased so as to move toward being oriented upwardly.

8. The vehicle of claim 1, wherein the distance of the pedals from the axis of rotation of the wheel structure is adjustable, the pedals being movable between releasable fixedly-secured positions.

9. The vehicle of claim 1, wherein the distance of the pedals from the axis of rotation of the wheel structure is movable during use, the pedals biased toward a base position, yet movable from the base position by application of a counter-bias force from the user during use.

10. The vehicle of claim 1, wherein the wheel rim has an elliptical shape.

11. The vehicle of claim 1, wherein the contact members are configured to contact a user's legs at or below the knee.

12. A pedal-powered vehicle, comprising:
a single wheel structure having an axis of rotation, a wheel rim, and a first tire coupled on the rim;
a first pedal and a second pedal coupled to the wheel structure and spaced from the axis of rotation to permit a user to propel the wheel structure by movement of the pedals around the axis of rotation; and
first and second leg contact members arranged toward the interior side of the first and second pedals, respectively, and ascending substantially above their respective pedals during use to contact the inside of a user's legs above the foot and at or below the knee to permit a user to control the vehicle by applying inward pressure from their legs onto the leg stabilization contact members;
wherein the first and second leg contact members move along with their respective pedals.

13. The vehicle of claim 12 configured to be seatless.

14. The vehicle of claim 12, wherein each contact member includes a substantially vertically ascending member, in use, that is coupled at one end proximate its respective pedal and has a leg contact surface coupled proximate the other end.

15. The vehicle of claim 14, wherein the leg contact surface has at least one of:
   a curved shape so as to center on a user's leg; and
   a compressible material disposed towards a user's leg.

16. The vehicle of claim 12, further comprising a frame coupled to the wheel rim and wherein the frame includes a single shaft and the pedals are coupled to that shaft.

17. The vehicle of claim 12, wherein the distance of the pedals from the axis of rotation of the wheel structure is adjustable.

18. A pedal-powered vehicle, comprising:
   a single wheel structure having an axis of rotation, a wheel rim, and a first tire coupled on the rim;
   a first pedal and a second pedal coupled to the wheel structure and spaced from the axis of rotation so as to permit a user to propel the wheel structure; and
   first and second leg stabilizing contact members arranged toward the interior side of and ascending above the first and second pedals, respectively, to contact the inside of a user's legs to permit a user to control the vehicle by applying inward pressure from their legs onto the leg stabilizing contact members;
   wherein the control members are biased to move towards an upright position.

19. The vehicle of claim 18, wherein the control members each include a leg contact surface and an ascending portion, the ascending portion being located between the leg contact surface and the respective pedal, the horizontal dimension of the leg contact surface in the line of direction of travel, when the contact member is in the upright position, being greater than the horizontal dimension of the ascending portion in the line of direction of travel.

20. The vehicle of claim 19, wherein the leg stabilizing control members are configured to contact a user's legs at or below the knee and above the foot.

* * * * *